(12) United States Patent
Heinrich et al.

(10) Patent No.: US 12,070,796 B2
(45) Date of Patent: Aug. 27, 2024

(54) SLIDING CLOSURE AT THE OUTLET OF A METALLURGICAL VESSEL

(71) Applicant: REFRACTORY INTELLECTUAL PROPERTY GMBH & CO. KG, Vienna (AT)

(72) Inventors: Beat Heinrich, Zurich (CH); Jean-Daniel Cousin, Lucerne (CH); Robert Hein Loedeman, Rickenbach (CH)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 666 days.

(21) Appl. No.: 17/271,798

(22) PCT Filed: Jul. 3, 2019

(86) PCT No.: PCT/EP2019/067909
§ 371 (c)(1),
(2) Date: Feb. 26, 2021

(87) PCT Pub. No.: WO2020/048658
PCT Pub. Date: Mar. 12, 2020

(65) Prior Publication Data
US 2021/0339311 A1    Nov. 4, 2021

(30) Foreign Application Priority Data

Sep. 4, 2018 (CH) .................................... 01051/18

(51) Int. Cl.
*B22D 41/34* (2006.01)
*B25J 11/00* (2006.01)

(52) U.S. Cl.
CPC ............... *B22D 41/34* (2013.01); *B25J 11/00* (2013.01)

(58) Field of Classification Search
CPC ........ B22D 41/24; B22D 41/34; B22D 41/38; B22D 41/22; B22D 41/40; B25J 11/00
(Continued)

(56) References Cited

U.S. PATENT DOCUMENTS 4,848,604 A * 7/1989 Fricker ................. B22D 41/24
                                                    222/600
5,478,055 A   12/1995 Kawamura et al.
(Continued)

FOREIGN PATENT DOCUMENTS

DE         4432462 A1    3/1995
DE    102009051148 A1    5/2010
(Continued)

*Primary Examiner* — Jessee R Roe
*Assistant Examiner* — Michael Aboagye
(74) *Attorney, Agent, or Firm* — Brian Roffe

(57) ABSTRACT

Sliding closure at an outlet of a metallurgical vessel includes a housing fastened to the vessel, a slider unit coupled and longitudinally displaceable relative to the housing, and a respective cassette arranged in the housing and/or slider unit and which operatively retains a refractory closure plate having an opening for passage of medium from the vessel. The closure plate is fixable in and releasable from the cassette by interaction of structure on the cassette and housing or slider unit. This structure includes a retaining element and an elbow lever mechanism on opposite end sides of the cassette, and a corresponding receiver element and snap-in element on opposite sides of the housing or slider unit such that the cassette can be pushed into the housing or slider unit at an angle and fixed therein by pressure through engagement of the elbow lever mechanism with the snap-in element.

20 Claims, 3 Drawing Sheets

(58) Field of Classification Search
USPC .......................... 222/597, 591, 600; 266/236
See application file for complete search history.

(56) References Cited

U.S. PATENT DOCUMENTS

| | | | |
|---|---|---|---|
| 5,645,793 A | 7/1997 | Yamamoto et al. | |
| 6,422,435 B1* | 7/2002 | Toaldo | B22D 41/40 |
| | | | 222/600 |
| 6,929,052 B2* | 8/2005 | Fischer | B22D 18/04 |
| | | | 164/119 |
| 8,376,196 B2* | 2/2013 | Ebner | B22D 41/24 |
| | | | 266/236 |
| 8,498,740 B2* | 7/2013 | Truttmann | B22D 41/22 |
| | | | 222/597 |
| 8,740,024 B2 | 6/2014 | Steiner et al. | |
| 8,795,583 B2 | 8/2014 | Heller et al. | |
| 9,027,802 B2* | 5/2015 | Steiner | B22D 41/24 |
| | | | 222/600 |
| 9,108,245 B2 | 8/2015 | Steiner et al. | |
| 9,314,841 B2 | 4/2016 | Steiner et al. | |
| 9,757,798 B2 | 9/2017 | Gisler et al. | |
| 10,376,954 B2 | 8/2019 | Infanger et al. | |
| 10,471,505 B2 | 11/2019 | Cousin et al. | |
| 2011/0295390 A1 | 12/2011 | Chu et al. | |

FOREIGN PATENT DOCUMENTS

| | | |
|---|---|---|
| EP | 2056983 B1 | 2/2011 |
| JP | S5945464 B2 | 11/1984 |
| JP | H06190542 A | 7/1994 |
| WO | 2020048658 A1 | 3/2020 |

* cited by examiner

SLIDING CLOSURE AT THE OUTLET OF A METALLURGICAL VESSEL

FIELD OF THE INVENTION

The invention relates to a sliding closure at the outlet of a metallurgical vessel including a housing configured to be fastened to the vessel and a slider unit coupled to the housing and longitudinally displaceable relative to the housing.

BACKGROUND OF THE INVENTION

With a known method according to the published document EP-2 056 983 a method and/or an installation is disclosed of a sliding closure mounted at the outlet of a vessel for molten metal. This installation is provided with at least one tool magazine, at least one spare part magazine and with means for opening and closing the sliding closure. For this purpose, a robot provided with an automatic grip changing system and a control system is available, which, firstly, is capable of automatically detecting the precise position of the vessel or the sliding closure. It can then actuate the means for opening and closing the sliding closure and, depending on the condition of the individual components that might require replacement, can take tools and/or spare parts from the magazines surrounding it and carry out cleaning operations, component removal and replacement or reinstallation.

OBJECTS AND SUMMARY OF THE INVENTION

On this basis, the task forming the basis of the present invention has been to further develop a method for maintenance operation of the type described above that is optimally adapted to the harsh operating conditions in the steelworks and, in particular, to the ladle area.

This problem is solved according to the invention by a sliding closure having a respective cassette arranged in the housing and/or slider unit and each being configured to retain a refractory closure plate having an opening for passage of medium from the vessel. The sliding closure also includes connecting means associated with each cassette for enabling fixing and releasing of the refractory closure plate when retained therein in said cassette. The connecting means include at least one retaining element on one end side of the cassette, at least one elbow lever mechanism on an opposite end side of the cassette, and when the cassette is arranged in the housing, at least one corresponding receiver element on one side of the housing, and at least one snap-in element on an opposite side of the housing. When the cassette is arranged in the slider unit, the connecting means includes at least one corresponding receiver element on one side of the slider unit, and at least one snap-in element on an opposite side of the slider unit. The cassette is configured to be pushed into the housing or slider unit at an angle and fixed therein by pressure through engagement of the at least one elbow lever mechanism with the at least one snap-in element.

With the method for maintenance of a sliding closure at the outlet of a metallurgical vessel in accordance with the invention, this can be changed from automated maintenance with the robot to manual maintenance of the sliding closure and vice versa, in part carrying out different operations.

Consequently, according to the circumstances at the maintenance location, it is very simple to change from automated to manual maintenance and thereby the operations for a plate replacement or for monitoring can be carried out in one or the other maintenance operation rationally and successfully.

It is very advantageous for automated maintenance for the closure plates to be kept together with a cassette in the housing and inserted in the slider unit and/or removed from this; in manual maintenance operation, however, these cassettes are fixed in the housing or preferably also in the sliding unit and the closure plates are manually inserted directly into these cassettes and centered therein or fastened or released.

With sliding units according to the invention, a cassette is kept in the housing and/or in the slider unit to receive a closure plate, which can be fixed therein or released, respectively by automatically lockable or releasable connecting means.

Preferably, for these connecting means for the removable cassettes at each end side at least one retaining means is provided and, opposite, at least one elbow lever mechanism with, corresponding recesses at one end and snap-in elements at the other. With this configuration of the cassettes, the same can be directly inserted or removed in automated maintenance without additional functions.

BRIEF DESCRIPTION OF THE DRAWINGS

The invention together with further advantages of the same are explained in the following in more detail with the aid of exemplary embodiments by reference to the drawing. It shows.

DETAILED DESCRIPTION OF THE INVENTION

Figure 1:
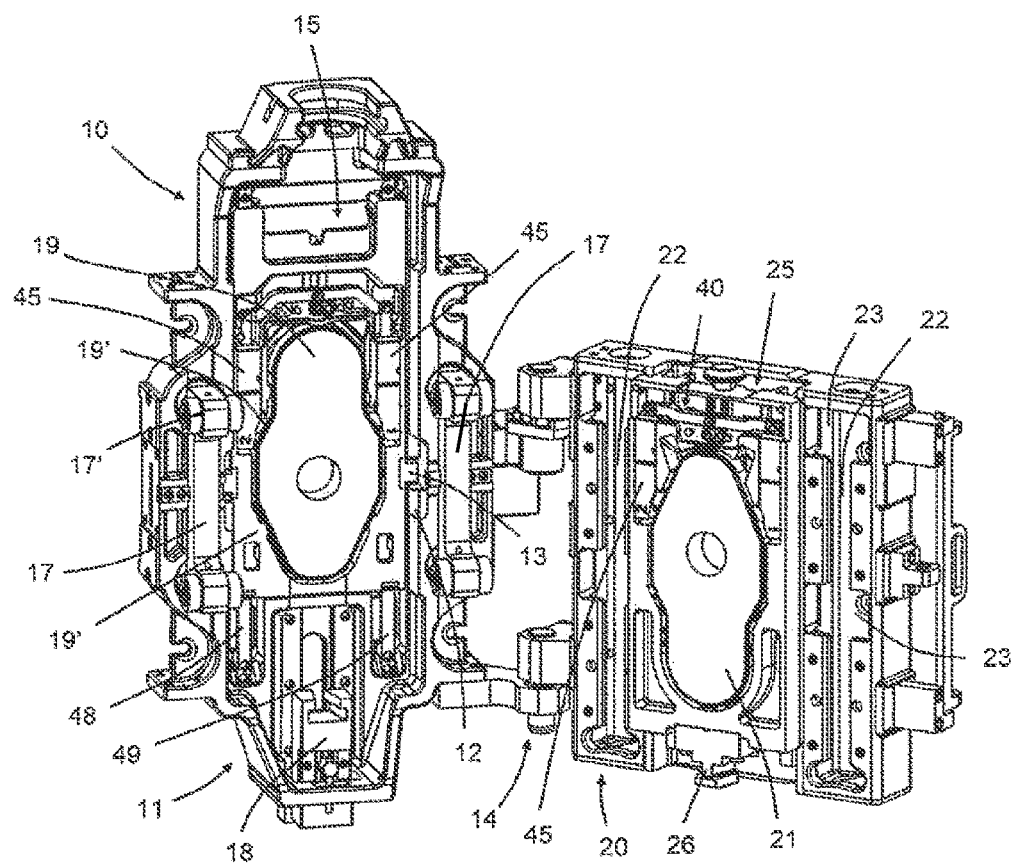
FIG. 1 is a perspective view of a sliding closure in accordance with the invention in an unfolded state.

The sliding closure 10 according to FIG. 1 essentially consists of a housing 11 which can be fastened to a vessel and a slider unit 20 pivotably linked to this by means of a hinge 14, which is shown in an unfolded open position. A refractory closure plate 19, 21 is respectively clamped in the housing 11 and in the slider unit 20 and are pressed together in the closed state of the sliding closure.

Such a sliding closure 10 is itself manufactured in a conventional manner and this is suitable preferably for a ladle containing molten steel for pouring in a continuous casting plant. However, it could be used with other vessels, for example with a converter or a distributor or perhaps with furnaces in the non-ferrous metals sector.

In the housing 11, on either side of the closure plate 19 a perpendicular retaining means 17 is arranged with rollers 17' on the inside and outside, which in the folded state slide on ramp-like guide tracks, not shown in more detail, of T-groove shaped recesses 22 in the slider unit 20. These recesses 22 are provided with widening openings 23, through which the rollers 17' are inserted or released. Therewith, the slider unit 20 is guided longitudinally on the housing 11 by a drive, not shown, usually by a piston/cylinder unit attached to the housing 11, of which the connectable coupling parts 18, 26 with the housing 11 or with the slider unit 20 are shown.

During pivoting of the slider unit 20, this is moved longitudinally relative to the housing by the drive, through the guidance of the rollers 17' on the ramp-like guide tracks, into these recesses 22 and thereby the closure plates 19, 21 are clamped against one another and conversely released again.

On the mode of functioning of this sliding closure 10 in more detail, reference is made to the document EP 1 119 428, in which the details of the interaction of the retaining means with the slider unit are explained at length.

According to the invention, a metallic cassette 15, 25 is contained in the each of the housing 11 and the slider unit 20 to receive the closure plates 19, 21, which can be respectively fixed therein or released by automatically lockable or releasable connecting means.

In the cassettes 15, 25, clamping modules 45 extending on either side of the closure plates 19, 21 are each associated with a clamping device 40, by means of which the closure plates 19, 21 with their four external sloping surfaces 19' can be fixedly clamped, as is explained in detail in the following.

Furthermore, centering elements 13 and their corresponding guide elements 12 are arranged laterally of the cassette 15 or in the housing 11. Thus, the cassette 15 is precentered during introduction into the housing 11 and the centering elements 13 effect a fixation of the same in the displacement direction of the slider unit 20, in order to accommodate the resulting displacement forces in the clamped state of the plates.

Figure 2:
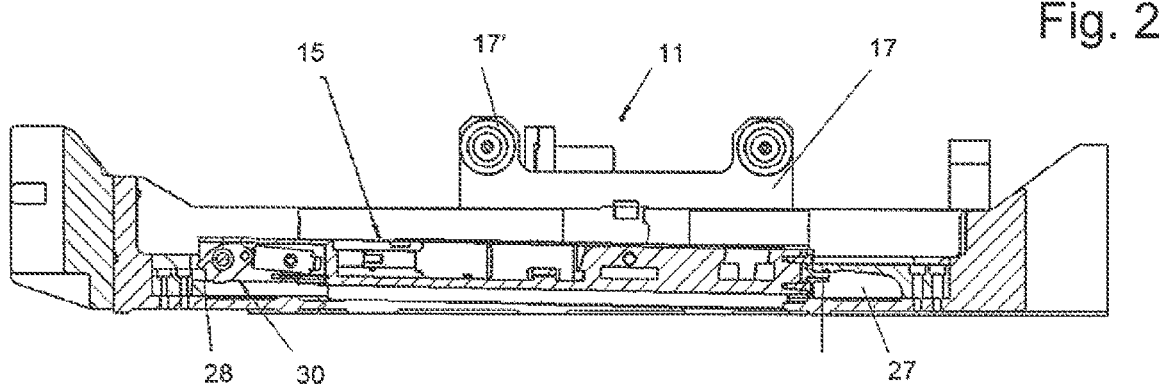
FIG. 2 is a longitudinal section of the housing and the cassette of the sliding closure according to FIG. 1 as the cassette is being pushed into the housing.
Figure 3:
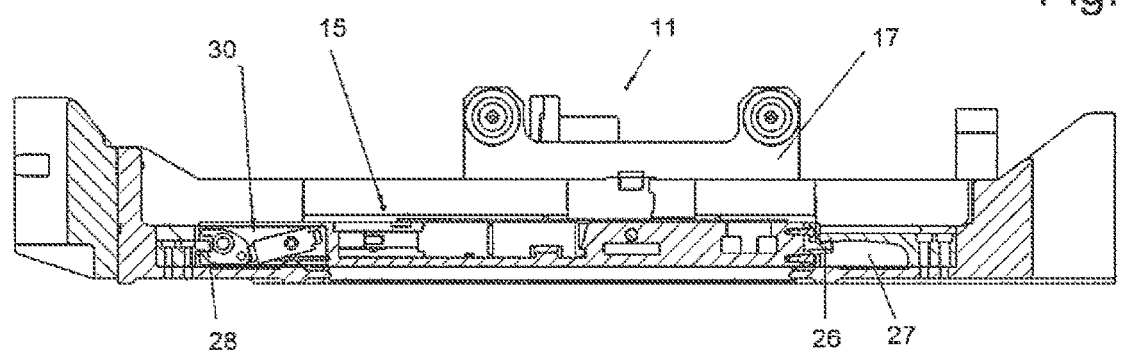
FIG. 3 is the longitudinal section of FIG. 2 with the cassette pushed into the housing and in fixed position.

According to FIG. 2 and FIG. 3, cams 26 are provided as connection means for the cassette 15, insertable in the housing 11 on the narrower end side as retaining elements, and opposite preferably two elbow lever mechanisms 30 positioned parallel to one another, while corresponding recesses 27 are provided in the housing 11 with spring retaining elements 48, 49 on one side and snap-action elements 28 (also referred to as snap-in elements herein) on the other.

As can be seen in FIG. 2, the cassette 15 is introduced at an angle into the housing 11, until its cams 26 at one end of the cassette are inserted precisely into this recess 27 in the housing 11 and, as a consequence of the pressure, the cassette 15 is fixed in the housing 11 without play through the snap-in element 28 by engagement with the elbow lever mechanism 30, as shown in FIG. 3.

Figure 4:
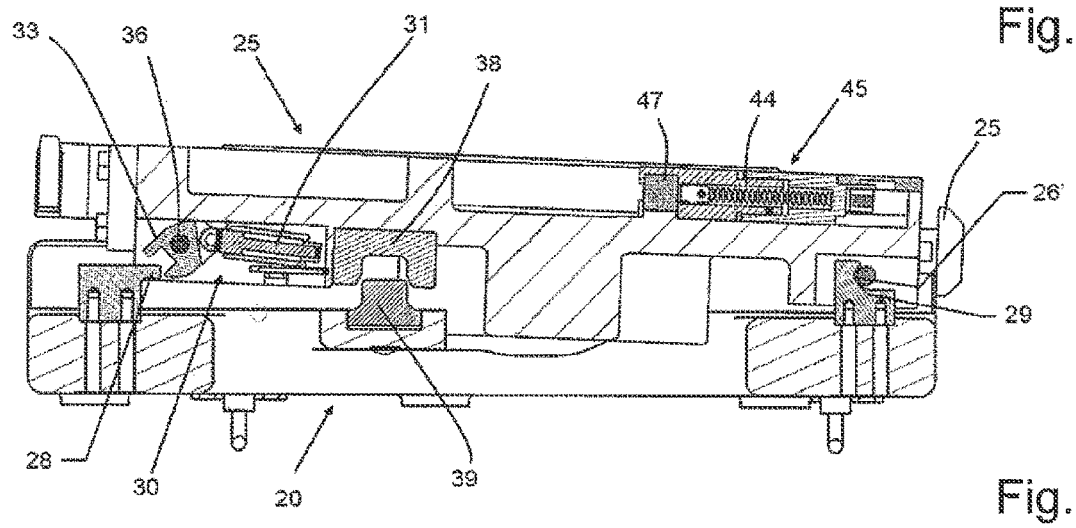
FIG. 4 is a longitudinal section of the sliding closure and the cassette of the sliding closure according to FIG. 1 during pushing of the cassette into the slider unit.

According to FIG. 4, as connecting elements for the cassette 25 insertable into the slider unit 20, pins 26' are arranged as retaining elements on the narrower end and similarly, opposite them, two parallel elbow lever mechanisms 30, while the stops 29 (also referred to as abutments herein) corresponding to the slider unit 20 are provided as retaining elements on one side and the snap-in elements 28 on the other side. In addition, the cassette 25 is centered by means of centering elements 38 in corresponding guide elements 39 and is held in the displacement direction, so that the cassette also cannot move therein with back and forth movement of the slider unit.

The cassette 25 is inserted into the slider unit 20 almost obliquely, until its pins 26' engage these stops 29 at one end of the slider unit, and as a consequence of the pressure, the cassette is fixed therein without play though the latching elbow lever mechanism 30 with the snap-in element 28.

Figure 5:
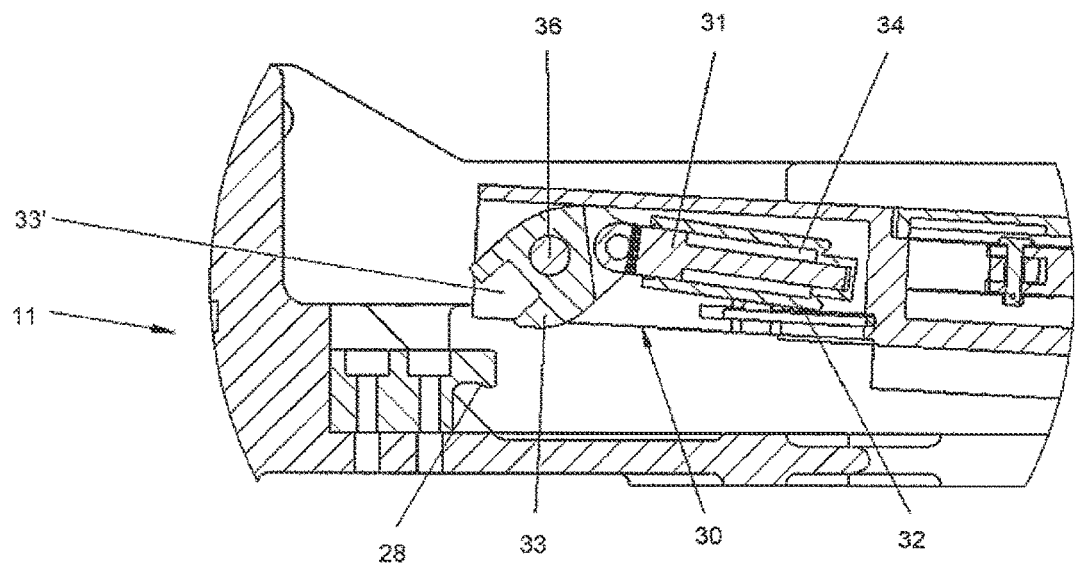
FIG. 5 is an enlarged section of the elbow lever mechanism during pushing of the cassette according to FIG. 2.
Figure 6:
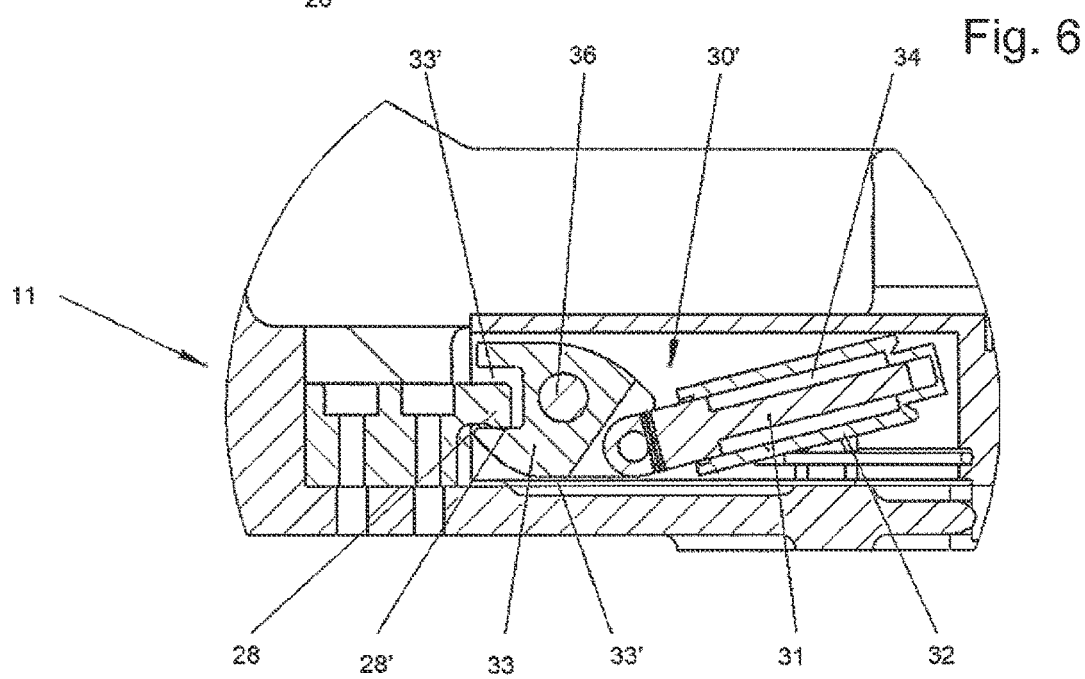
FIG. 6 is the enlarged view of the elbow lever mechanism after the cassette has been pushed in as in FIG. 3.

The respective elbow lever mechanism 30 with the cassettes 15, 25, is shown in an enlarged view in FIG. 5 and FIG. 6, of a spring-loaded lever 31 hinged in the cassette 15, 25 and a snapper 33 rotatably attached to this, mounted pivotably on the cassette 15, 25 by means of a spindle 36. The lever 31 has limited adjustment in its longitudinal direction with a compression spring 34 in a sleeve 32 and, except in the dead center, it produces with it a continuously acting torque against the snapper 33.

In the released state according to FIG. 5, the snapper 33 is directed with aperture 33' against the direction of pressure of the cassette. With further pressure this snapper 33 with its aperture 33' comes into contact with the snap-in element 28 and is then rotated it until it rests with its underside 33" on the housing 11 or the slider unit 20. Thus the lever 31 engaging the snap-in element 33, after passing through the dead point, effects a torque through the compression spring 34 on this snapper 33, until the same rests on a lower support 28' of the snap-in element 28 and thus the retention of the cassette is assured.

Removal of the cassette 15, 25, is effected by a specific tensile force on the same, approximately perpendicularly away from the housing 11 or from the slider unit 20, so that the elbow lever mechanism 30 is turned by the resultant torque on the snapper 33 at the lower support 28' in the direction towards the open position, as shown in FIG. 5. This also enables the cassettes 15, 25 to be released automatically.

Figure 7:
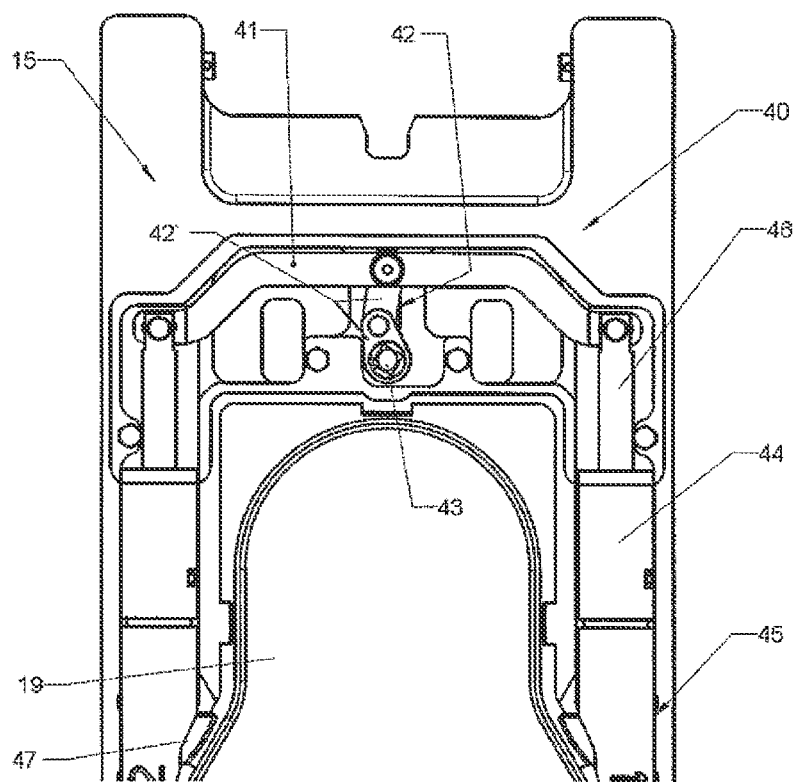
FIG. 7 is a plan view on the partially shown cassette with the clamping module for clamping a closure plate in the released state.
Figure 8:
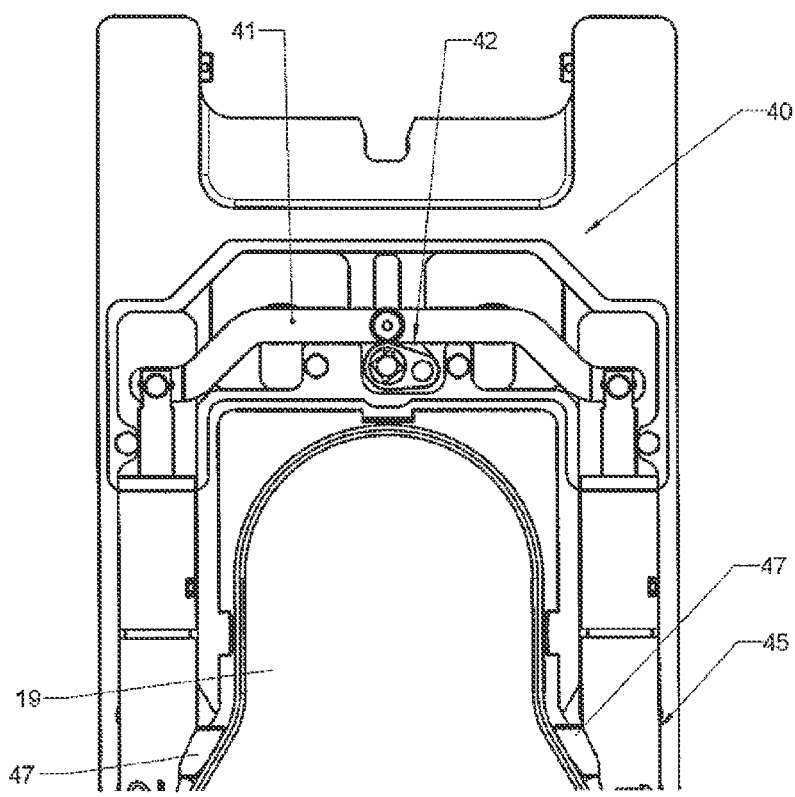
FIG. 8 is the plan view of FIG. 7 with the clamping module in the clamped state.

FIG. 7 and FIG. 8 show, in the context of the invention, a clamping device 40 capable of clamping the closure plate 19, in a cassette 15, which is composed of an adjustment clip 41, clamping modules 45 either side of the closure plate 19, with push rods 46 and wedges 47 as well as an elbow lever linkage 42. The clamping modules 45 are incorporated in the cassette 15 and each has a spring member 44, which is connected with a respective push rod 46 and acts so that in the braced state a spring pressure is produced in the stressing direction, as can also be seen in FIG. 4. This elbow lever linkage 42 consists of two levers 42', which are connected to the adjustment clip 41, the cassette 15, and to each other. The one lever 42' has a square opening or similar, into which a turnkey can inserted and can be turned by hand and thus enable opening or closing of the clamping device.

This clamping device 40 is shown in FIG. 7 in the open position, in which the wedges 47 adjustable with the push rods 46 are withdrawn and thus the closure plate is insertable or withdrawable. The two levers 42' are rotated beyond the dead center and act together with the spring pressure, so that the adjustment clip 41 remains in the open position.

By turning in the opposite direction, the adjustment clip and with it the push rods 46 and also the wedges 47 are moved in the direction of the closure plate and then clamping of the plate 19 is enabled, as shown in FIG. 8.

With the cassette 25 that can be inserted into the slider unit 20, a similar clamping device 40 is provided for clamping the closure plate provided as for a slide plate, as described above with the other cassette 15.

The sliding closure 10 described in detail above is suitable for an automated maintenance by a robot, not shown in more detail, at a maintenance location, as explained in detail and illustrated in the document EP 2 056 983 mentioned at the beginning. This vessel provided as ladle, after emptying of the metal melt, is located at the maintenance area, roughly in a horizontal position, so that the sliding closure mounted at its outlet is on its side and thus is easily accessible for this maintenance that is often required.

With a detection system that can be mounted on the robot, the precise position of the vessel and the sliding closure 10 at the maintenance area can be determined. Following this recognition, a drive can be mounted on the sliding closure and connected to a pressure source, with which the sliding closure 10 can be released and the slider unit 20 can be swung out, as can be seen in FIG. 1. Thereafter the robot can at times insert a refractory closure plate 19, 21 in this slider unit 20, or in the housing 11, or can remove it from here.

According to the invention, the automated maintenance with the robot can be changed over to a manual maintenance of the sliding closure 10 at the maintenance area or the reverse, where different working steps take place when automated maintenance becomes manual maintenance.

During automated maintenance, the closure plates 19, 21, together with the metal cassette 15, 25 are grasped by the robot from a magazine and correspondingly inserted into the housing 11 and into the slider unit 20, or are removed from them, while conversely, during manual maintenance operation, these cassettes 15, 25 are fixed in the housing 11 or in the slider unit 20 and the closure plates 19, 21 are inserted manually directly into these cassettes 15, 25 and centered therein or fastened or respectively released.

Advantageously, moreover, the mounting, not shown, for the drive with the coupling part 18 for the housing 11 is positioned on the opposite side for automated maintenance to that for manual maintenance, for simpler manipulation.

However, within the context of the invention, the maintenance of the sliding closure 10 can also take place in a mixed operation, with part manual and part automated operation stages. For example, the drive can be installed by robot and also the closure plates in the cassettes can be changed by it, while manual cleaning operations or the plates can be inspected for their condition after pouring.

The invention is adequately demonstrated with the above exemplary embodiment. However, it could obviously be implemented by other variants. Thus, these automatically lockable or releasable connection means for the cassettes can be implemented instead of the elbow lever mechanism by a door latch system or a snap-in mechanism with a compressible bent spring or similar.

Likewise, these connecting means could be arranged so that, for example, the elbow lever mechanism would be contained inverted in the housing or in the slider unit and the corresponding recesses and snap-in elements would be available in the respective cassette. In addition, retaining means could be provided, which would be positioned along the longitudinal side of the cassettes and the housing of the slider unit, for example as snap-in elements.

In principle, only one interchangeable cassette could be provided in the housing, while the slider unit would be removed as a whole by the robot or suspended again by means of hinges located on the housing.

The sliding closure could also be configured so that, instead of a housing and a slider unit mounted displaceably on it, an additional slider cover could be provided, which would be fastenable on the housing by attachment means. With an automated operation, the robot could tighten or release these fastening means with a suitable operating unit.

The invention claimed is:

1. Sliding closure at an outlet of a metallurgical vessel, comprising:
a housing configured to be fastened to the vessel;
a slider unit coupled to said housing and longitudinally displaceable relative to said housing;
a respective cassette arranged in at least one of said housing and said slider unit and being configured to retain a refractory closure plate having an opening for passage of medium from the at least one retaining element on one end side of said respective cassette; and
at least one elbow lever mechanism on an opposite end side of said respective cassette from said at least one retaining element, said at least one retaining element and said at least one elbow lever mechanism cooperating to define part of connecting means associated with each said respective cassette for enabling fixing and releasing of the refractory closure plate when retained in said respective cassette to said respective cassette;
said connecting means further comprising, when said respective cassette is arranged in said housing,
at least one corresponding receiver element on one side of said housing; and
at least one snap-in element on an opposite side of said housing from said at least one corresponding receiver element, and
said connecting means further comprising, when said respective cassette is arranged in said slider unit,
at least one corresponding receiver element on one side of said slider unit; and
at least one snap-in element on an opposite side of said slider unit from said at least one corresponding receiver element,
wherein said respective cassette is configured to be pushed into said housing or said slider unit at an angle and fixed therein by pressure through engagement of said at least one elbow lever mechanism with said at least one snap-in element.

2. The sliding closure of claim 1, wherein said connecting means are configured to enable automatic locking of the refractory closure plate in said respective cassette and automatic release of the refractory closure plate from said respective cassette.

3. The sliding closure of claim 1, wherein said respective cassette is arranged in said housing and said at least one retaining element comprises at least one cam in said respective cassette, said at least one corresponding receiver element of said connecting means comprising at least one corresponding recess.

4. The sliding closure of claim 1, wherein said respective cassette is arranged in said slider unit and said at least one retaining element comprises at least one pin in said respective cassette, said at least one corresponding receiver element of said connecting means comprising at least one abutment.

5. The sliding closure of claim 4, wherein said at least one pin comprises two pins and said at least one elbow lever mechanism comprises two parallel elbow lever mechanisms each situated opposite a respective one of said two pins.

6. The sliding closure of claim 1, wherein each of said at least one elbow lever mechanism comprises:
a spring-loaded lever in said respective cassette;
a snapper rotationally connected to said spring-loaded lever; and
a spindle about which said snapper is pivotably mounted.

7. The sliding closure of claim 6, wherein said spring-loaded lever comprises a sleeve and a compression spring in said sleeve, and wherein said compression spring provides said spring-loaded lever with limited adjustment in its longitudinal direction and is biased to enable said spring-loaded lever to continuously produce torque against said snapper.

8. The sliding closure of claim 6, wherein said respective cassette is arranged in said housing and, in a fixed state of said refractory closure plate in said respective cassette, a lower support of said snapper is in contact with said at least one snap-in element, whereby producing a tensile force on said respective cassette in a direction perpendicular from said housing causes rotation of said elbow lever mechanism by torque resulting on said snapper with said lower support in a direction toward release of said at least one snap-in element from said snapper to an open position and thus release of said respective cassette.

9. The sliding closure of claim 6, wherein said respective cassette is arranged in said slider unit and, in a fixed state of said refractory closure plate in said respective cassette, a lower support of said snapper is in contact with said at least one snap-in element, whereby producing a tensile force on said respective cassette in a direction perpendicular from said slider unit causes rotation of said elbow lever mechanism by torque resulting on said snapper with said lower support in a direction toward release of said at least one snap-in element from said snapper to an open position and thus release of said respective cassette.

10. The sliding closure of claim 1, wherein said respective cassette is arranged in said housing, said cassette comprises lateral centering elements, and said housing comprises guide elements corresponding to said centering elements.

11. The sliding closure of claim 1, wherein each said respective cassette comprises a clamping device configured to fixedly clamp the refractory closure plate in said respective cassette, said clamping device comprising:
   a clamping module on each of a pair of opposite sides of a space in which the refractory closure plate is to be retained in said respective cassette; and
   push rods, wedges and an elbow lever linkage for actuating said clamping device.

12. The sliding closure of claim 11, wherein said clamping modules are embedded in said respective cassette and each includes a spring member connected to a respective one of said push rods to enable production of spring pressure in a clamped state of said clamping device.

13. The sliding closure of claim 1, wherein said slider unit is pivotally linked to said housing by a hinge, said housing being configured to retain an additional refractory closure plate when said respective cassette is arranged in said slider unit and said slider unit being configured to retain an additional refractory closure plate when said respective cassette is arranged in said housing.

14. The sliding closure of claim 1, wherein said respective cassette consists of two cassettes, one of said two cassettes being arranged in said housing and another one of said two cassettes being arranged in said slider unit.

15. The sliding closure of claim 1, wherein said at least one elbow lever mechanism comprises two elbow lever mechanisms positioned parallel to one another.

16. The sliding closure of claim 1, wherein said at least one corresponding receiver element comprises two corresponding receiver elements and said at least one snap-in element comprises two snap-in elements.

17. Sliding closure at an outlet of a metallurgical vessel, comprising:
   a housing configured to be fastened to the vessel;
   a slider unit coupled to said housing and longitudinally displaceable relative to said housing; and a cassette arranged in said housing and being configured to retain a refractory closure plate having an opening for passage of medium from the vessel; at least one retaining element on one end side of said cassette; and at least one elbow lever mechanism on an opposite end side of said cassette from said at least one retaining element, said at least one retaining element and said at least one elbow lever mechanism cooperating to define part of connecting means associated with said cassette for enabling fixing and releasing of the refractory closure plate when retained in said cassette;
   said cassette comprising lateral centering elements, and said housing comprising guide elements corresponding to said centering elements,
   whereby said guide elements of said housing cooperate with said lateral centering elements to precenter said cassette during introduction of said cassette in said housing.

18. The sliding closure of claim 17, wherein said lateral centering elements are configured to effect a fixation of said cassette in a direction of displacement of said slider unit.

19. Sliding closure at an outlet of a metallurgical vessel, comprising:
   a housing configured to be fastened to the vessel;
   a slider unit coupled to said housing and longitudinally displaceable relative to said housing;
   a respective cassette arranged in at least one of said housing and said slider unit and being configured to retain a refractory closure plate having an opening for passage of medium from the vessel; at least one retaining element on one end side of said respective cassette; and at least one elbow lever mechanism on an opposite end side of said respective cassette from said at least one retaining element, said at least one retaining element and said at least one elbow lever mechanism cooperating to define part of connecting means associated with each said respective cassette for enabling fixing and releasing of the refractory closure plate when retained in said respective cassette to said respective cassette,
   each said respective cassette comprising a clamping device configured to fixedly clamp the refractory closure plate, said clamping device comprising:
   a clamping module on each of a pair of opposite sides of a space in which the refractory closure plate is to be retained in said respective cassette; and
   push rods, wedges and an elbow lever linkage for actuating said clamping device.

20. The sliding closure of claim 19, wherein said clamping modules are embedded in said respective cassette and each includes a spring member connected to a respective one of said push rods to enable production of spring pressure in a clamped state of said clamping device.

* * * * *

UNITED STATES PATENT AND TRADEMARK OFFICE
CERTIFICATE OF CORRECTION

PATENT NO. : 12,070,796 B2  
APPLICATION NO. : 17/271798  
DATED : August 27, 2024  
INVENTOR(S) : Beat Heinrich, Jean-Daniel Cousin and Robert Hein Loedeman Page 1 of 1

It is certified that error appears in the above-identified patent and that said Letters Patent is hereby corrected as shown below:

In the Claims

Claim 1:
Column 6, Line 6, after "from the", insert --vessel;--.

Claim 17:
Column 8, Line 17, after "when retained in said cassette", insert --to said cassette--.

Signed and Sealed this  
Twenty-fourth Day of June, 2025

Coke Morgan Stewart  
*Acting Director of the United States Patent and Trademark Office*